Nov. 23, 1937.  C. G. MAHANA  2,099,817
VEHICLE BEARING
Filed April 14, 1934
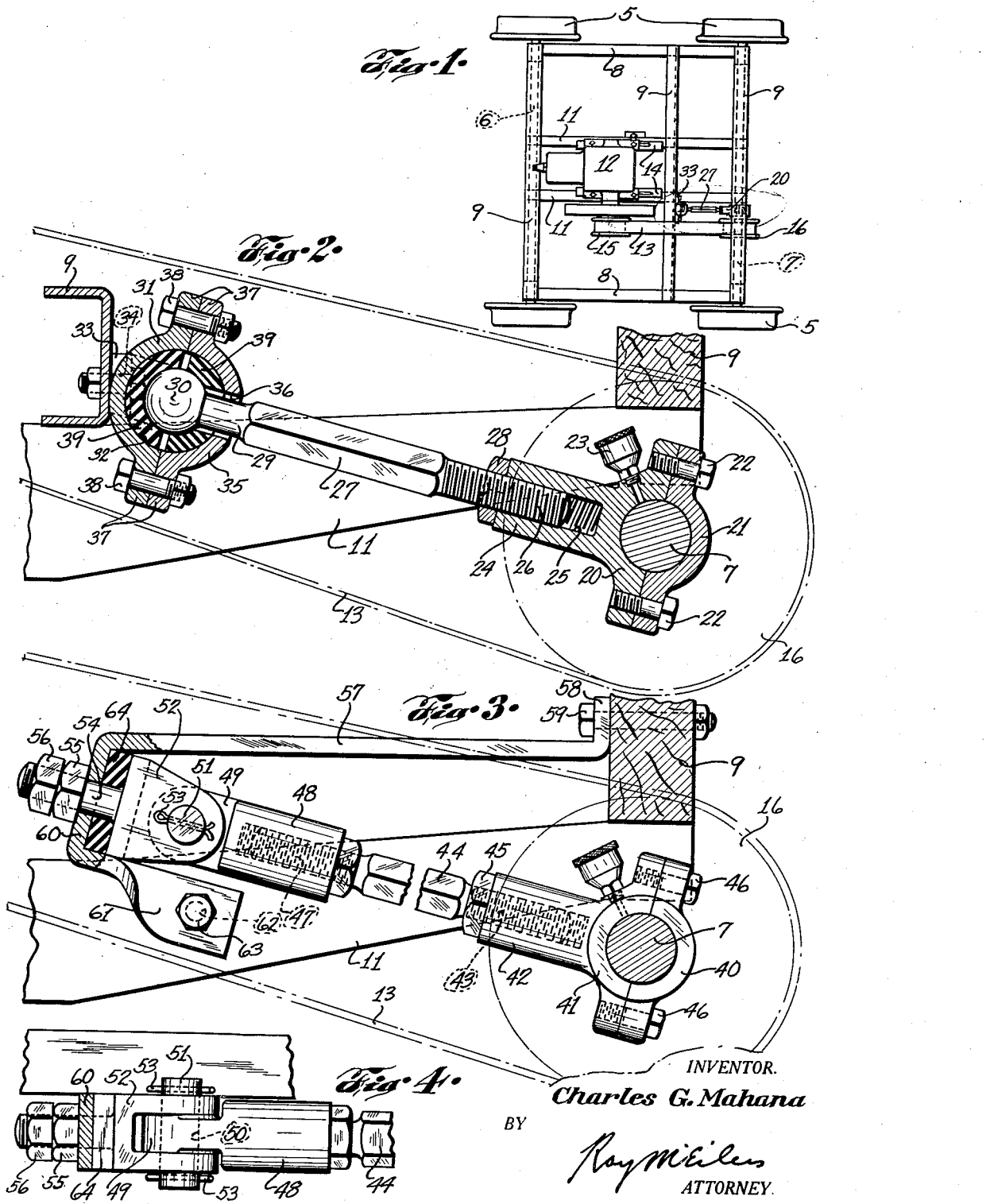
INVENTOR.
Charles G. Mahana
BY
Roy M Eiler
ATTORNEY.

Patented Nov. 23, 1937

2,099,817

UNITED STATES PATENT OFFICE 2,099,817

VEHICLE BEARING

Charles G. Mahana, Three Rivers, Mich., assignor to Fairbanks, Morse & Company, Chicago, Ill., a corporation of Illinois Application April 14, 1934, Serial No. 720,537

10 Claims. (Cl. 105—102)

This invention relates to improvements in vehicle bearings, and more particularly to an improved structure for resisting deflection of drive axles of railway motor cars and like vehicles, due, for example, to sudden application of driving stresses, abnormal tension of a drive belt or chain, or other stresses tending to deflect the axle in a direction forwardly of the car.

The present invention is of particular advantage as embodied in railway motor cars of extremely light weight and construction, in which the frames, axles, and in fact, all parts of the chassis, are constructed of a minimum weight, to facilitate the car to be removed from or replaced on the track by one or two men. The general type of car to which the invention is applicable with particular advantage, is the prevailing line of gasoline-driven, one or two man railway inspection cars. An essential of success of this type of vehicle, lies in their being so minimized in weight that they can easily be lifted on to and off of a track often in emergency. Many of the cars of this type are chain or belt driven directly from the engine to the axle, the engine usually being of one or two cylinder type, since the heavier multi-cylinder engines are objectionable by reason of weight.

Due to the lightness of the frames and chassis parts of cars of the type referred to, and due to the location of the axle sprocket or pulley between the ends of the axle, jerks or sudden pulls imparted to the driving chain or belt tend objectionably to deflect the axle which is usually journalled at or near its ends to the side frame members of the car.

The present invention accordingly has for its major object the provision of light weight, easily adjustable means for steadying the intermediate portions of the drive axles of railway motor cars, and opposing axle-deflecting stresses, principally those imparted through the driving belt or chain.

A further object of the invention is attained in an improved provision for the purpose noted in the preceding object, and which serves to distribute in an improved manner, the propulsive forces imparted to the frame of the car through the driving mechanism.

Yet another object of the invention is attained in the provision of improved means for the purposes noted in the preceding objects, and yet which will operate independently of the extent of loading of the vehicle, to serve its purpose as a steadying bearing for the drive axle or shaft.

Another object is the provision of improved cushioning means for a torque member serving to connect a steady-bearing to a frame member remote from such bearing.

A still further object of the invention is attained in an improved adjustable mounting arm for an axle-steadying bearing of the type noted, and which, according to certain embodiments of the invention, is so connected to the frame structure of the car as to permit a fully universal movement of the radius arm, within reasonable limits, with respect to the car.

The foregoing and still further objects will more fully appear from the following detailed description of selected embodiments of the invention, and from the accompanying drawing, in which:

Fig. 1 is a plan view of the chassis or frame of a railway motor car to which the present invention is applied; Fig. 2 is a sectional elevation of the axle steadying-bearing together with associated arm elements, illustrating one manner of connecting the structure to the vehicle frame; Fig. 3 is a view taken similarly to Fig. 2 but illustrating certain modifications of the structure and mounting of the steadying-bearing elements, and Fig. 4 is a fragmentary top or plan view of the structure of Fig. 3.

Referring now by numerals of reference to the drawing, there is illustrated by Fig. 1 a railway motor car chassis which may be of any usual or suitable type, and which for purposes of illustration, may be considered as embodying the track wheels 5, a front axle 6, a rear axle designated generally at 7, side frame members 8, and cross-frame or sill members 9. According to prevailing practice, the longitudinal elements of the chassis include a pair of intermediate members 11, serving as supports for the engine 12.

A not unusual method of mounting the engine consists in disposing it slidably by means of a suitable sliding base mounting not necessary to be shown in detail, so that the engine may be moved forwardly or rearwardly upon the chassis for the purposes of tightening or loosening the drive belt 13. The engine may be constrained to movement forwardly and rearwardly of the car by a pair of guide elements 14. The belt 13 serves operatively to connect the engine through its pulley 15, to a drive pulley 16, located substantially inwardly of the ends of the rear axle 7. It will of course be understood that, while for convenience of illustration I have shown a belt and pulley connection between the engine and rear axle, the invention is equally applicable to an arrangement employing a chain drive including a chain-engaging sprocket (not shown) on the motor, and a suitable similar sprocket (not shown) on the rear axle 7. Accordingly, even though reference be made herein to a belt and pulley drive, it is to be understood as equally applicable to any usual drive system employing a flexible power transmission element such as a chain.

It will appear that deflection of the drive axle 7, in a direction forwardly of the car, could be opposed by a bearing of usual type (not shown) disposed between the usual drive axle journals, and secured to the adjacent rearmost cross member of the frame. However, in a car of light weight construction the cross members are often themselves subjected to sagging stresses under the heavy loading of men and track maintenance equipment. Such a bearing would, for this reason, fail of its intended purpose, since it would tend at times to deflect the drive axle in a vertical plane.

I have overcome the noted difficulty in the present instance by providing a bearing consisting of an element 20 and a companion cap 21 secured in assembly by the usual cap screws, such as 22, with or without employing shims (not shown) therebetween. The element 20 may be provided with a grease cup 23, or other desired means for lubricating the axle steadying-bearing. Projecting in a direction forwardly of the car from the element constituting a bearing half 20, is a preferably integral, tubular projection 24, internally threaded as at 25 for the reception of the threaded end 26 of a radius arm 27. The latter is preferably of hexagon or octagon section, so as to facilitate its rotation, for purposes of adjustment, by threading the end 26 thereof to greater or less depths in the internally threaded portion 25 of member 24. A jamb nut 28 also threadedly engages the shank 26, and serves to maintain the arm 27 in adjusted position. Near the opposite end of the radius arm 27, is a reduced portion 29, at the free end of which is a spherical or ball element 30. A socketed holder for the ball element 30 is provided by a bracket element 31 consisting, as illustrated by Figs. 1 and 2, of a central half-spherical socket portion 32 provided with ears 33, each apertured as at 34 for bolted or riveted securement to one of the cross sills 9 of the car frame.

The companion part-spherical bearing element detachably associated with the member 32, is shown at 35, and except as lacking the lugs 33, is or may be substantially the same as the element 32. The member 35 is, however, provided with an aperture 36 of somewhat larger diameter than that of the reduced end 29 of the radius arm 27, so that, as appears in Fig. 2, the arm 27 is permitted a limited though universal movement, relative to the fixedly mounted socket. As a means of securing the elements 32 and 35 in assembled relation, each is provided with securement lugs 37, coacting in pairs and apertured to receive bearing bolts 38. Internally of the assembled spherical halves 32 and 35 are disposed a pair of rubber liner elements 39, each of hollow hemispherical form, the recesses and internal dimensions of which are such that the journal end 30 of the rod 27 is rather tightly gripped between the rubber elements, so that the rod end serves to flex the rubber, rather than to work upon it. It will appear from this construction that any shocks incident to sudden application of driving forces, or incident to any abnormal jerks or pulls of the driving belt, will be transmitted endwise or axially of the radius arm 27, and will be cushioned by the rubber elements 39. It will of course be apparent that driving stresses will normally be transmitted, at least in part, through the radius arm and through this arm and the parts described, to the cross sill 9 by which the socketed structure is carried. It is to be observed as my preference that the socket structure be so mounted as to bring the arm 27 parallel as closely as possible to the line of drive, i. e., parallel to the center line connecting the drive and driven pulleys, whereby the structure of the radius arm, bearing, socket and associated elements may be kept of minimum weight, consistent with their intended purposes.

A slightly modified arrangement of steadying-bearing, radius arm and associated parts, and a modified mounting therefor, are shown by Fig. 3. For certain types of car and service, the arrangement of Fig. 3 is equally as desirable as that of Fig. 2, the general purpose and location being similar to the arrangement already described. Referring particularly to Fig. 3, the structure of the drive axle bearing proper is or may be identical with that shown by Fig. 2, and consists of mating bearing halves 40 and 41, the latter provided with a hollow or tubular extension 42 for the reception of the threaded end 43 of the modified radius arm 44. A lock nut 45 serves a purpose identical with nut 28 of Fig. 2. The bearing halves 40 and 41 are shown as secured in assembly about the shaft by means of cap screws 46 which may be identical with the elements 22 of Fig. 2.

Unlike the arm 27, the arm 44 is threaded at both of its ends, the forwardmost end 47 being similar to the threaded end 43 except that one thereof, say 43, is provided with right hand threads, while the other, say 47, carries left hand threads. For engagement with the threaded end 47 of arm 44 there is provided an internally threaded socket structure 48 terminating in an eye element 49 (Fig. 4). The aperture 50 of the eye element serves to receive a pin 51, which also engages a furcate element or yoke 52 and is conveniently secured in place as by cotter keys 53 extended through openings therefor in the ends of the pin 51. The yoke 52 is U-shaped in plan, and is provided centrally of its bridge portion with a threaded stud 54 for the reception of an adjusting nut and a lock nut indicated respectively at 55 and 56.

According to the arrangement of Figs. 3 and 4, a metal strap 57 is provided with an upturned end or lug portion 58 apertured for the reception of a bolt 59 by which the element is secured to the rear cross member or sill 9 of the car frame. From the lug 58 the strap element extends longitudinally of the car and overlies the arm 44 and appurtenant parts, being bent downwardly at its opposite end to form a bridge or saddle portion 60, whence the element 57 is bent rearwardly of the car and provided with an angularly displaced terminal portion 61 apertured as at 62, for the reception of a bolt 63 by which this end of the saddle element or bracket is secured to a parallel and adjacent longitudinal member 11 of the car frame. The saddle portion 60 of the element 57 is apertured to permit passage therethrough of the threaded stud 54, and between the bridge of member 52 and the saddle 60, is disposed an apertured rubber cushioning element 64. This provision corresponds in purpose to the provision of the elements 39 of Fig. 2, and serves as a resilient abutment for the forward end of the radius arm and connected parts, and serves to absorb shocks or jars imparted endwise to the arm, from any cause.

I have shown the radius arm 44 as threaded at both ends with the threads of opposite trend on the opposite ends. This provides a convenient and facile means of adjusting the effective length of the rod or arm, but it will of course be understood that I have contemplated among possible modifications, an arrangement in which one, say the forward end 47 of rod 44 terminates in an integral eye member such as 49, without the intervention of the second threaded connection. It may further be mentioned that the bracketing or supporting provisions as exemplified by parts 51, 60, etc. may be replaced by connecting the threaded stud 54 directly to either a wood or metal cross sill of the frame. Obviously the double threaded adjustment afforded by the structure of Fig. 3 may be applied to the ball and socket connection illustrated by Fig. 2 in a manner not necessary to be further illustrated or described.

The changes discussed are not intended to exhaust the possibility of modification, since numerous other changes in the parts, as well as their combinations and association with the chassis elements of the car, may be made without departing from the spirit and full intended scope of the invention as defined by the appended claims.

I claim as my invention:

1. In a railway motor car of a type driven through a flexible driving element such as a chain or belt, including means for adjusting the flexible driving element, a drive axle of rotating, live type, an axle-driving element mounted thereon substantially inwardly of its ends, a bearing in which the axle is journaled near said driving element, an arm connected near one of its ends to said bearing, and extending along the line of drive, means detachably securing the arm near its opposite end to a frame member of the car, said arm and bearing coacting to prevent substantial forward deflection of the drive axle adjacent said axle-driving element, and means for adjusting the length of the arm, the last said means being disposed to function independently of the adjustment of the flexible driving element.

2. In a railway motor car, a flexible power transmission element, a drive axle, a driven element carried by the axle, means for adjusting the tension of the transmission element, an axle-steadying bearing on the axle near the driven element, an arm projecting forwardly of the axle and connected to said bearing near the rear end of the arm, a pivoted joint at the forward end of the arm, means, including said joint, for anchoring the forward end of the arm to a portion of the car frame, and means for adjusting the effective length of the arm without affecting the adjustment of said transmission element.

3. In a railway motor car, a flexible power transmission element, a drive axle, a driven element carried by the axle substantially inwardly of its ends, means for adjusting the tension of the transmission element, an axle-steadying bearing on the axle near the driven element and adjacent the mid-section of the axle, an arm connected to said bearing, and extended along the path of travel of the flexible transmission element, a screw-threaded connection in said arm for adjusting its length, and means yieldably positioning the arm against displacement forwardly of the car.

4. In a railway motor car, a flexible power transmission element, a drive axle, a driven element carried by the axle, means for adjusting the tension of the transmission element, an axle-steadying bearing on the axle near the driven element, said bearing being located adjacent the mid-section of the axle, an arm connected to said bearing, means operatively independent of said tension-adjusting means, for varying the length of said arm, a pivoted connection from the arm to the frame of the car permitting movement of the arm in a vertical plane, and a cushioning element opposing movement of the arm forwardly of the car, said bearing, arm and cushioning element coacting to prevent substantial forward deflection of said drive axle.

5. In a railway motor car, a flexible power transmission element, an element driven thereby, a drive axle carrying the driven element, an axle-steadying bearing on the axle near the driven element, an arm extended forwardly of said bearing, a ball and socket connection at the forward end of said arm, to a frame member of the car, and means for adjusting the tension of the flexible transmission element, and the length of said arm, independently of each other.

6. In a railway motor car of a type employing a drive axle and a flexible power transmission element connected thereto, a bearing on the axle near the transmission element, an arm projected forwardly of the car from said bearing, said arm having a threaded member projecting from its forward end, an anchoring structure for the forward end of the arm including a metal strap element secured to a cross member of the car frame and extended forwardly therefrom, the forward portion of the anchoring element forming a saddle for seating the forward end of the arm, the saddle portion being apertured to pass the said threaded element and projecting rearwardly of the saddle portion to form a second point of securement to the car frame.

7. In combination in a railway motor car of a type including a rear axle and a flexible transmission element connected thereto, an axle-steadying bearing carried by the axle near the transmission element, an arm projected forwardly of the bearing, a saddle strap constituting an anchorage or abutment for the forward end of said arm, said strap being secured to a transverse sill element of the car frame and provided with a substantially U-shaped saddle portion forwardly of said sill element for receiving the forward end portion of the arm structure, a yoke element within the saddle portion, and provided with a threaded stud, the saddle portion having an aperture for receiving said stud, the saddle element being further anchored to a frame member of the car near its forward end and provided internally with a rubber cushion element, and a pin by which the forward end of the arm is pivotally secured to said yoke member.

8. An axle-steadying bearing structure for use in a railway motor car of chain or belt driven type, the motor car including a frame having a transverse sill element located forwardly of the drive axle, said bearing structure including an axle-bearing located near the axle drive element, and substantially inwardly of the ends of the axle, whereby the bearing structure may serve to limit forward deflection of the axle, the bearing being formed of two bearing halves detachably secured together in journalling relation about the axle while permitting free movement of the bearing in a plane normal to the axle, a threaded socket carried by one of said bearing halves, an arm having a threaded shank engaging said socket and provided with a lock nut, the arm having a portion of polygonal section between its ends, a ball portion formed on the opposite end of said arm, a socket structure formed of two internally hemispherical portions, detachably secured together, and means anchoring said socket structure to said transverse sill.

9. An axle-steadying bearing structure for use in a railway motor car of chain or belt driven type, the motor car including a frame comprised of a plurality of sill elements, said bearing structure including a two part axle bearing located near the axle driving element and substantially inwardly of each end of the axle, the two parts of the bearing coacting to journal the axle and permit free pivotal movement thereon of the bearing, in a vertical plane, a socket carried by said bearing, an arm threadedly engaging said socket and extending forwardly from said bearing along the line of drive, said arm being threaded at its opposite or forwardmost end, the threads thereon being of a trend or direction opposite to those engaging the bearing structure, a socket element threadedly engaging said forward end of the arm, a member pivotally supporting said socket element, a resilient abutment for said member, a strap secured to sill elements of the car frame and formed to provide a rigid saddle portion intermediate its ends, and means securing said member and resilient abutment in said saddle portion and means positioning said abutment with respect to the frame members of the car.

10. In combination in a railway motor car of chain or belt driven type, including a rear axle and frame elements to which the axle is journalled, a flexible driving element such as a chain or belt, means for driving the flexible element, a member driven thereby and carried by the axle substantially inwardly of each end thereof, means for adjusting the tension of the flexible element, an axle-steadying bearing pivotally mounted on the axle adjacent the drive element, said bearing being provided with a forwardly extended internally threaded socket, an axle-steadying arm projected forwardly of said bearing and socket, a socket member at the forward or opposite end of said arm, the arm being threaded on one end with a right hand thread engaging one of said sockets and at opposite end with a left hand thread engaging the other socket, lock nuts on the arm for maintaining adjustment thereof, a pivoted connection on said forward socket, an anchorage for said pivoted connection by which it is positioned with respect to the frame elements of the car, but free of any securement with respect to the flexible driving element and driving means and a resilient cushioning element between the pivoted connection and said anchorage.

CHARLES G. MAHANA.